No. 761,723. Patented June 7, 1904.

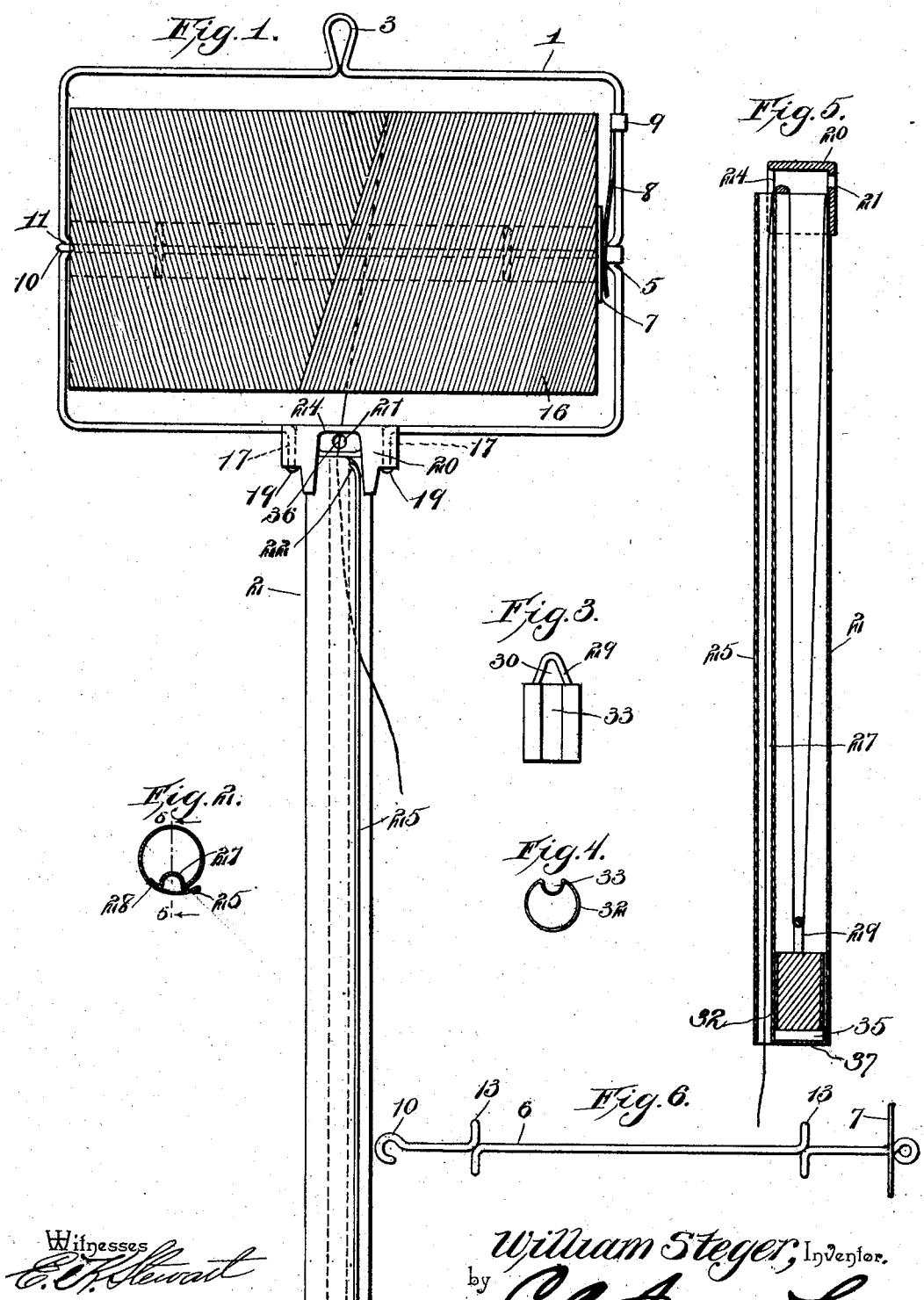

UNITED STATES PATENT OFFICE.

WILLIAM STEGER, OF MARIETTA, OHIO.

TWINE-HOLDER.

SPECIFICATION forming part of Letters Patent No. 761,723, dated June 7, 1904.

Application filed August 4, 1903. Serial No. 168,230. (No model.)

*To all whom it may concern:*

Be it known that I, WILLIAM STEGER, a citizen of the United States, residing at Marietta, in the county of Washington and State of Ohio, have invented a new and useful Twine-Holder, of which the following is a specification.

This invention relates generally to twine-holders, and more particularly to that type of twine-holders in which a weight mounted for reciprocation in a suitable guide forms a slack take-up.

The object of the present invention is to improve twine-holders of the type specified by providing therein means for holding the twine so that it may be kept at the right tension, by providing a twine-guide in which the twine may be readily positioned, and by providing a device not easily deranged.

A further object of the present invention is to improve the means for supporting the twine in the twine-holder and to provide an improved form of weight-guide.

The invention consists in the construction and combination of parts of a twine-holder hereinafter described, and illustrated in the accompanying drawings, in which—

Figure 1 is a front elevation of the twine-holder complete with a cop of twine in position therein with the terminal portion of the twine partially drawn through the twine-guide. Fig. 2 is a cross-sectional view of the tube forming the twine and weight guide. Fig. 3 is a side view. Fig. 4 is an end view from below of the weight. Fig. 5 is a view in vertical section through the guide-tube on the line 5 5 of Fig. 2. Fig. 6 is a detail view of the spindle upon which the cop of twine is supported in the twine-holder.

Referring now to the drawings, in which corresponding parts are designated by the same characters of reference, 1 designates generally a frame of wire of substantially rectangular form within which the cop of twine is supported. 2 designates generally the guide-tube for the weight and the terminal portion of the twine, and 20 designates a •head formed of sheet metal or cast metal, preferably the latter, which is secured in any desired manner at the top of the tube 2 and has rigidly mounted thereon the frame 1.

The frame 1 is of substantially rectangular form, as shown, is formed, preferably, of wire of suitable weight, and is provided in the upper horizontal portion thereof with a loop 3 to facilitate its suspension from a suitable supporting member. The frame 1 has small bends formed in the vertical sides thereof at 5 and 11, as shown, the bend 5 being a little longer than the bend 11 and being adapted to serve as a pintle upon which swings the arm 6, which forms the spindle upon which the cop or roll of twine 16 is supported. The arm 6 is provided at its free end with a hook 10 for engagement with the bent portion 11 of the frame 1 and may be brought into engagement with said bent portion 11 by springing the frame inward to a slight extent.

In order to hold the twine under suitable tension, there is provided on the arm 6 a plate 7, which is adapted to contact with the roll, as shown in Fig. 1, and to hold the plate 7 in contact with the roll or cop a spring 8 is secured at 9 to the frame 1 and has its free end slotted and in contact with the plate 7.

In order to insure sufficiently free rotation of the roll or cop 16 upon the spindle, the latter is provided between its ends with two approximately circular loops 13, which form supporting-surfaces upon which the cop turns.

The frame 1 is rigidly secured upon the head 20 by bending down at right angles to the bottom member of the frame the terminal portions 17, which are inserted into sockets provided therefor in the head 20, and by riveting the ends of said terminal portions, as shown at 19.

The tube 2, which forms the combined weight and twine guide, is formed of a single piece of sheet metal rolled upon itself, as shown in Fig. 2, and this tube is rigidly attached at its upper end by soldering or riveting to the head 20. The head 20 is hollow, as best seen in Fig. 5, and is provided at the rear with a guide-opening 21 and in front with a similar guide-opening 24, through which the twine (shown at 36) passes. In the body portion of the tube 2 under the overlapping portion which terminates in the beaded edge 25 is formed a groove 27, which serves as a twine-guide and which by projecting into the lumen of the tube forms a rib which engages with a correspondingly-shaped groove in the side of the weight presently to be described and forms a guide which prevents the turning of the weight within the tube. The tube 2 has the inner margin thereof soldered at 28 to the overlapping portion, and the outer margin 25 is free to permit the ready insertion of the terminal portion of the twine 36 into the guide-roll 27. To avoid possibility of cutting the twine in introducing it into the guide-groove, the edge 25 is upset, as already stated, and the upper corner of the overlapped portion of the tube is bent outward, as indicated at 22. The weight, which serves as a slack take-up, is provided at its upper end with an eye 29, presenting an opening 30, and is coated on the outside with a layer of suitable soft material, as cloth, (shown at 32,) to diminish the sound due to the scraping of the weight along the wall of the guide-tube and to diminish the friction occasioned thereby. The weight is provided with a groove 33, corresponding in cross-section to the rib formed by the twine-guide groove 27, so that when the weight is in position, as indicated in Fig. 5, it is susceptible of free vertical movement within the tube, but cannot be rotated therein. Within the bottom of the tube is secured a pad 35, of soft material, to cushion the descent of the weight, and the bottom of the tube is closed by a small plate 37, secured thereon in any suitable manner.

In use the cop or roll of twine will be placed in position in the frame, as shown in Fig. 1. The holder will then be inverted to cause the weight to drop to the end of the tube adjacent to the openings 21 and 24. Then the terminal portion 36 of the twine will be passed through openings 21 and 24 and through the eye 29. The twine will then be drawn down through the opening between the beaded edge 25 of the overlapped portion of the tube 2 and the body of the tube to introduce it into the twine-guide, as shown in Fig. 1. When the terminal portion of the twine has been brought into proper position in the guide, the device will be restored to the position indicated in Fig. 1, and the weight will be allowed to descend to the bottom of the tube 2, leaving the terminal portion of the twine projecting downward from the bottom of the tube 2, as shown in Fig. 5. When twine is drawn downward through the guide 27, the weight will rise to the top of the tube 2 and remain there as long as the twine is being unwound from the cop; but as soon as the pull upon the terminal portion of the twine ceases the weight will return under the influence of gravity to the bottom of the tube and take up the slack in the twine.

Having thus described the construction and operation of my invention, what I claim as new, and desire to secure by Letters Patent, is—

1. In a twine-holder, the combination of cop-supporting means, a take-up weight, and a guide member having separate passages for the weight and the twine, the twine-passage being open at one side.

2. In a twine-holder, a double tubular guide formed of a single piece of sheet metal with an overlap leaving a space between the overlap and the body of the tube to form a twine-guide, and the interior of the tube being adapted to form a guide for a take-up weight.

3. In a twine-holder, a combined tubular twine and weight guide formed of a single piece of sheet metal having overlapping portions with the outer end thereof free from the tube.

4. In a twine-holder, a combined tubular weight and twine guide formed of a single piece of sheet metal having an overlapping portion with a free edge beaded to prevent cutting of the twine and having its upper end spaced from the body of the tube to permit the insertion of the twine between the overlapping portion and the body of the tube.

5. In a twine-holder, the combination of cop-supporting means, a weight-guide, a take-up weight arranged for sliding movement in said guide, and a twine-guide associated with said weight-guide and adapted to prevent rotation of the weight within the weight-guide.

6. In a twine-holder, a combined tubular weight and twine guide having a rib disposed longitudinally of the tube and projecting into the lumen thereof to engage with a groove in the weight and prevent rotation of the weight within the tube.

7. In a twine-holder, a rectangular cop-supporting frame having one side indented, a cop-supporting spindle having a bent end encircling said indented portion of the side, and a hook at the end for engagement with the opposite side of the frame.

8. In a twine-holder, a rectangular cop-supporting frame of elastic material, a cop-supporting spindle pivotally mounted at one side of said frame and having a hook for engagement with the other side of the frame, a plate slidably mounted on said pivoted spindle, and means on the cop-supporting frame for forcing said plate into frictional engagement with the end of the cop.

9. In a twine-holder, a suitable frame, a cop-supporting spindle arranged transversely thereof, a plate slidably mounted on said spindle and a spring mounted on said frame and adapted to engage said plate when the spindle is in position for use to hold it in contact with a cop mounted on said spindle.

10. In a twine-holder, a suitable frame, and a cop-supporting spindle mounted in said frame and provided intermediate of its ends with rounded loops to form supporting-surfaces for a cop.

In testimony that I claim the foregoing as my own I have hereto affixed my signature in the presence of two witnesses.

WILLIAM STEGER.

Witnesses:
M. F. GILMAN,
WM. A. FULLER.